US012420515B2

(12) United States Patent
White et al.

(10) Patent No.: US 12,420,515 B2
(45) Date of Patent: Sep. 23, 2025

(54) FILL MATERIAL CUTTING SYSTEMS FOR PARTIALLY OR FULLY CUTTING FILL MATERIAL

(71) Applicant: Sealed Air Corporation (US), Charlotte, NC (US)

(72) Inventors: Patrick G. White, Westford, MA (US); Cody Frederick Morse, Lunenburg, MA (US); Junkai He, Wakefield, MA (US); Thomas Paul Orsini, Sterling, MA (US); Steven Edward Maston, Princeton, MA (US); Russell Thomas Christman, Dunstable, MA (US)

(73) Assignee: Sealed Air Corporation (US), Charlotte, NC (US)

(*) Notice: Subject to any disclaimer, the term of this patent is extended or adjusted under 35 U.S.C. 154(b) by 0 days.

(21) Appl. No.: 18/722,006

(22) PCT Filed: Dec. 15, 2022

(86) PCT No.: PCT/US2022/052924
§ 371 (c)(1),
(2) Date: Jun. 20, 2024

(87) PCT Pub. No.: WO2023/121936
PCT Pub. Date: Jun. 29, 2023

(65) Prior Publication Data

US 2025/0135742 A1 May 1, 2025

Related U.S. Application Data

(60) Provisional application No. 63/292,108, filed on Dec. 21, 2021.

(51) Int. Cl.
*B31D 5/00* (2017.01)
*B26D 1/00* (2006.01)
(Continued)

(52) U.S. Cl.
CPC ......... *B31D 5/0043* (2013.01); *B26D 1/0006* (2013.01); *B26D 1/085* (2013.01);
(Continued)

(58) Field of Classification Search
CPC .......... B31D 5/0073; B31D 2205/0023; B31D 2205/0052; B31D 5/0078; B31D 1/0031; B31D 2205/0058; B31D 2205/0088
(Continued)

(56) References Cited

U.S. PATENT DOCUMENTS 4,674,268 A * 6/1987 Gavronsky ........... B29C 44/182 141/10
6,277,459 B1 * 8/2001 Lencoski ............... B65D 81/09 428/218
(Continued)

FOREIGN PATENT DOCUMENTS

WO 2020056106 A1 3/2020

*Primary Examiner* — Jacob A Smith
(74) *Attorney, Agent, or Firm* — Jon M. Isaacson

(57) ABSTRACT

A system includes a source of sheet material and a conversion machine. The conversion machine is configured to receive the sheet material and to form the sheet material into a fill material. The conversion machine further includes a cutting system configured to selectively cut the fill material either partially or completely to form two pieces of the fill material. When the cutting system partially cuts the fill material, uncut portions of the fill material remain between the two pieces of the fill material. When the cutting system completely cuts the fill material, no uncut portions remain between the two pieces of the fill material.

19 Claims, 8 Drawing Sheets

(51) Int. Cl.
*B26D 1/08* (2006.01)
*B26F 1/18* (2006.01)

(52) U.S. Cl.
CPC .......... *B26F 1/18* (2013.01); *B26D 2001/006* (2013.01); *B31D 2205/0052* (2013.01); *B31D 2205/0058* (2013.01); *B31D 2205/0088* (2013.01)

(58) Field of Classification Search
USPC ............................. 53/403, 553, 374.8, 386.1
See application file for complete search history.

(56) References Cited

U.S. PATENT DOCUMENTS 7,497,066 B2 * 3/2009 Calogero ............ B29C 49/0691 53/403
2018/0297317 A1 * 10/2018 Lepine .................... B31B 70/16

* cited by examiner

FILL MATERIAL CUTTING SYSTEMS FOR PARTIALLY OR FULLY CUTTING FILL MATERIAL

BACKGROUND

The present disclosure is in the technical field of dunnage or packaging materials. More particularly, the present disclosure is directed to methods for producing package fill material from sheets of a selected substrate, such as paper.

Conversion machines for producing fill material from paper are well-known. Such conversion machines generally operate by pulling a web of paper from a roll or fanfold paper, manipulating the paper web in such a way as to convert the paper into fill material, and then severing the converted material into cut sections of a desired length. Conversion machines may be void fill conversion machines that form sheet material into fill material that can be used as void fill, cushion conversion machines that form sheet material into fill material that can be used as cushioning, or any other similar conversion machine. While such conversion machines are widely used and have been commercially successful in many applications, there is a need for improved functionality and decreased cost of some of the components of such conversion machines.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In a first embodiment, a system includes a source of sheet material and a conversion machine. The conversion machine is configured to receive the sheet material and to form the sheet material into a fill material. The system further includes a cutting system configured to selectively cut the fill material either partially or completely to form two pieces of the fill material. When the cutting system partially cuts the fill material, uncut portions of the fill material remain between the two pieces of the fill material. When the cutting system completely cuts the fill material, no uncut portions remain between the two pieces of the fill material.

In a second embodiment, when the cutting system of the first embodiment partially cuts the fill material, the uncut portions are arranged such that, when one of the two pieces of the fill material is pulled away from each other, the uncut portions tear, resulting in the two pieces of the fill material being separated from each other.

In a third embodiment, the cutting system of the first embodiment includes a cutter and a cutter receptacle. When the cutting system partially cuts the fill material, the cutter is moved to a point where a gap remains between a portion of the cutter and a portion of the cutter receptacle.

In a fourth embodiment, a width of the gap of the third embodiment is a percentage of the width of the cutter that is less than or equal to 10%.

In a fifth embodiment, the cutter of the third embodiment includes a V-shaped blade.

In a sixth embodiment, the portion of the cutter of the fifth embodiment that forms the gap includes an angle of the V-shaped blade.

In a seventh embodiment, the cutting system of the third embodiment further includes a motor configured to move the cutter with respect to the cutter receptacle.

In an eighth embodiment, the motor of the seventh embodiment is coupled to a first linkage and configured to rotate the first linkage.

In a ninth embodiment, the first linkage of the eighth embodiment is rotatably coupled to a second linkage and wherein the second linkage is rotatably coupled to the cutter.

In a tenth embodiment, the motor of the ninth embodiment is configured to move the cutter by rotating the first linkage.

In an eleventh embodiment, the motor of the tenth embodiment is configured to cause the cutting system to make a complete cut by rotating the first linkage to a first rotational position. The motor is configured to cause the cutting system to make a partial cut by rotating the first linkage to a second rotational position that is different from the first rotational position.

In a twelfth embodiment, when the cutting system of the first embodiment partially cuts the fill material, a percentage of a width of the fill material that remains connected by the uncut portions is in a range between about 1% and about 10%, optionally between about 3% and about 9%, and further optionally between about 5% and about 8%.

In a thirteenth embodiment, when the cutting system of the first embodiment partially cuts the fill material, a percentage of a width of the fill material that remains connected by each of the uncut portions is less than or equal to any one of 1%, 0.8%, 0.6%, 0.4%, or 0.2%.

In a fourteenth embodiment, a method comprises converting, by a fill conversion machine, a sheet material into a fill material and cutting, by a cutting system of the fill conversion machine, the fill material to form two pieces of fill material. The two pieces of fill material include a first piece and a second piece. The fill conversion machine is capable of both (1) making a partial cut of the fill material, where the partial cut leaves uncut portions of the fill material between the first and second pieces of the fill material, and (2) making a complete cut of the fill material, where the complete cut leaves no uncut portions remaining between the first and second pieces of the fill material.

In a fifteenth embodiment, the cutting of the fill material of the fourteenth embodiment comprises making the partial cut. The method further comprises holding, by the conversion machine, a second piece of the two pieces of fill material. The first piece is separable from the second piece during the holding by pulling the first piece from the second piece to cause the uncut portions of the fill material to tear.

In a sixteenth embodiment, the method of the fifteenth embodiment further includes detecting, by the conversion machine, that the first piece has been pulled away from the second piece.

In a seventeenth embodiment, the method of the sixteenth embodiment further includes, in response to the detecting, automatically advancing, by the conversion machine, the fill material out of the fill conversion machine. The method further includes, in response to the detecting, automatically cutting, by the cutting system of the conversion machine, the fill material to form a cut between the second piece and a third piece of the fill material such that uncut portions of the fill material remain between the second and third pieces of fill material.

In an eighteenth embodiment, the method of the seventeenth embodiment further includes holding, by the conversion machine, the third piece of fill material. The second piece is separable from the third piece during the holding of the third piece by pulling the second piece from the third piece to cause the uncut portions of the fill material between the second and third pieces to tear.

In a nineteenth embodiment, the method of the fourteenth embodiment further includes receiving, by a computing device of the fill conversion machine, a user input indicating a type of cut to be made, and controlling, by the computing device, the cutting system to make either the partial cut or the complete cut based at least in part on the user input In a twentieth embodiment, the method of the fourteenth embodiment further includes receiving, by a computing device of the fill conversion machine, a signal from a sensor, and controlling, by the computing device, the cutting system to make either the partial cut or the complete cut based at least in part on the signal from the sensor.

BRIEF DESCRIPTION OF THE DRAWING

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

Figure 1:
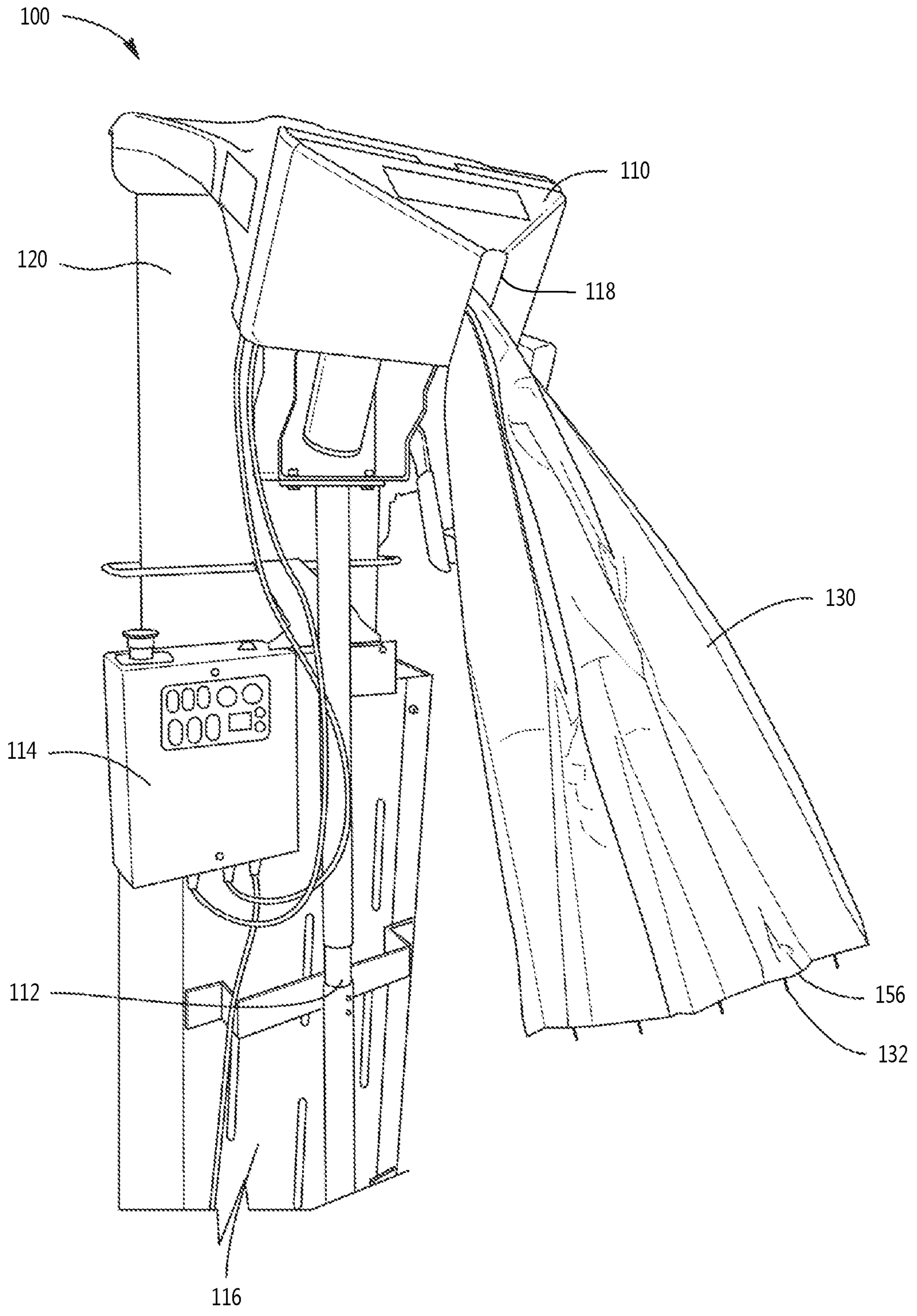
FIG. 1 depicts an embodiment of a conversion machine for producing fill material, a source of sheet material, and an embodiment of fill material cutting using one of the embodiments of cutting systems described herein.

Referring to FIG. 1, a system 100 is depicted that includes a conversion machine 110 for producing fill material 130 from a sheet material 120 of a selected substrate. In FIG. 1, the conversion machine 110 is depicted being supported by a support stand 112 that is configured to stand on the floor. Other configurations of the conversion machine 110 are possible, such as a tabletop configuration of the conversion machine 110. In the depicted configuration, the conversion machine 110 the support stand may be height adjustable or otherwise configurable us a user. Other related components, such as a control unit 114, a sheet supply bin 116, and a support base (not visible) may also be connected to the stand 112. The control unit 114 may include a user interface or other user operable switches, buttons, dials or other controls to manage operation of the conversion machine 110. For example, the control unit 114 may include an emergency stop button or other controls that allow an operator to adjust modes of operation or to select a particular length of fill material to dispense. The sheet supply bin 116 is sized and shaped to accommodate different sheet sizes and densities. In one embodiment, the size of the supply bin 116 may be adjustable to accommodate different sheet supply widths, for example 15" or 30" wide fanfold stock. In another embodiment, a sheet of fill material can be supplied to the conversion machine 110 in the form of a roll of stock sheet material. Thus, a horizontal bar (not shown) might be secured nearby or directly to the stand 112 to support such a roll of stock sheet material. In one embodiment, the sheet supply bin 116 might be positioned near, but not directly coupled to the conversion machine 110. In some embodiments, a support base secured to the stand 112 to a stable platform such as legs, casters, a table, or any other mounting location (e.g., a workbench or a product conveyor). The support base may be secured to a fixed or mobile platform as appropriate depending on the requirements of a particular packaging environment.

The conversion machine 110 is configured to receive a sheet material 120 and to convert the sheet material 120 into fill material 130. The fill material 130 has a configuration that is different from the sheet material. In some embodiments, the conversion machine 110 is configured to crush, crumple, fold, or otherwise deform the sheet material 120 from its sheet orientation into the non-sheet orientation of the fill material 130. The conversion machine 110 may include crush wheels, gears, deforming cylinders, folding bars, folding plates, pulleys, or other deforming components that are in the path of the sheet material 120 to cause the sheet material 120 to be converted from its sheet orientation (substantially a two-dimensional form) to the non-sheet orientation of the void fill material 130 (substantially a three-dimensional form). In the depicted embodiment, the fill material 130 is exiting the conversion machine 110 through an outlet 118.

Most conversion machines include a severing mechanism to periodically sever the converted fill material into pieces of fill material. The severed pieces can then be inserted into a container (e.g., a shipping box) as void fill or placed around an object as cushioning. One difficulty with severing the converted fill material is ensuring that the severed piece of fill material does not unintentionally fall out of the conversion machine. When severed pieces fall out of the conversion machine, a packer typically needs to spend extra time collecting the fallen piece and, in some cases, the piece is no longer usable. To address this problem, a catching device, such a bin, can be used to catch and hold severed pieces of fill material that fall out of the conversion machine. However, these catching devices can take up more space than is desirable in a packing environment and may not be ergonomic for a packer, such as if the packer must repeatedly bend down to pick up severed pieces of fill material out of the catching device. Another solution to this problem has been to provide a chute that directs falling pieces of severed fill material to the user. However, these chutes also take up space, may require the conversion machine to be moved away from the user, and do not solve the issue of intended dispensing of severed pieces of fill material.

Another solution that has been developed for some conversion machines is a conversion machine mode that is sometimes called “cut-and-hold” or “auto repeat.” When using a cut-and-hold option, a conversion machine typically produces a predetermined length of fill material and then cuts the material to form a separated piece of fill material.

The conversion machine then retains the piece of fill material for the packer to remove from the conversion machine. This retention is usually accomplished through friction between the piece of fill material and the conversion machine. Once the packer removes the piece of fill material from the conversion machine, the conversion machine produces another piece of fill material, cuts the material to form a new separated piece of fill material, and retains the new piece of fill material until the packer removes it from the conversion machine. However, the friction caused by the retention system has a tendency to jam the conversion machine, particularly when the conversion machine operates at high speeds (e.g., 300 feet/minute or more). Jamming of paper in the conversion machine results in down time of the conversion machine and labor costs to unjam the conversion machine. To compensate for jamming, the amount of tension or friction could be reduced on the retention system. However, with less friction and/tension during some of the hold periods, the retained piece of fill material sometimes falls out of the conversion machine (e.g., due to airflow—such as from fans—in the packer's area). When the retained piece of fill material falls out, the conversion machine produces another piece of fill material because it senses that the paper has been removed. This results in some of the same issues described above. Not only are the same issues present, but the cost and complexity of the conversion machine have risen due to the need for the retention system that holds pieces of fill material after they have been severed.

Systems have been developed to partially cut converted sheet material instead of fully cutting the converted sheet material. In some examples, conversion machines have a cutting element with a notched blade to cut through most of the converted material, but leave a number of uncut portions that connect both sides of the partial cut. Examples of such a system are shown in U.S. patent application Ser. No. 17/275,571, the contents of which are herein incorporated by reference in their entirety. In other examples, cutting elements can be designed to form perforations or other lines of weakness to partially cut converted sheet material.

While cutting systems have been developed to either fully cut converted sheet material or partially cut converted sheet material, having a cutting system that performs only one type of cut (e.g., either partial or complete) may not make the desired type of cut in all cases. For example, a conversion machine may have a complete cutting system to completely cut converted sheet material in a setting where a complete cut is expected to be desirable most of the time. In that example, there may be instances where a partial cut from that conversion machine may be desirable. In another example, a conversion machine may have a partial cutting system to partially cut converted sheet material in a setting where a partial cut is expected to be desirable most of the time. In that example, there may be instances where a complete cut from that conversion machine may be desirable. In order to provide both types of cuts, two different cutting systems could be added to a conversation machine and then selectively used to cut the converted sheet material each time a cut is made. However, installing two types of cutting systems on a single machine may be cumbersome and challenging, in addition to raising the cost and complexity of the conversion machine. It would be advantageous to have a single cutting system that can perform either a partial cut or a full cut of the converted sheet material.

Described herein are embodiments of cutting systems for conversion machines that are capable of either partially or fully cutting converted sheet material. As used here, the term partially cut refers to a cut that does not fully separate two pieces of fill material but allows for a packer to manually separate the two pieces of fill material. In some embodiments, the cutting system leaves a number of uncut portions across the cut ends of the two pieces of fill material. In some embodiments, the uncut portions are sufficiently small such that a packer can manually pull on one of the two pieces of cut fill material to cause the uncut portions to tear, resulting in the two pieces of cut fill material being separate from each other. In some examples, the percentage of the width of the cut fill material that is connected by all the uncut portions after the material is cut is in a range that is at least one of a range from about 1% to about 10%, a range from about 3% to about 9%, or a range from about 5% to about 8%. In some examples, the percentage of the width of the cut fill material that is connected by one of the uncut portions after the material is cut is less than or equal to any one of 1%, 0.8%, 0.6%, 0.4%, or 0.2%. In some embodiments, the uncut portions are capable of maintaining the two pieces connected until one of the pieces is pulled away from the other (e.g., pulled away by a packer). One benefit of the amount of fill material that remains uncut being relatively small is that the packer typically does not need to exert much force to tear the uncut portions as the packer pulls the two pieces apart. In some cases, the packer is unable to distinguish any difference in the amount of force required to pull out a piece of fill material from a cut-and-hold conversion machine (e.g., in existing conversion machines) and the amount of force required to tear the uncut portions of the paper that remain when using the cutting systems in the embodiments described herein.

Figure 2:
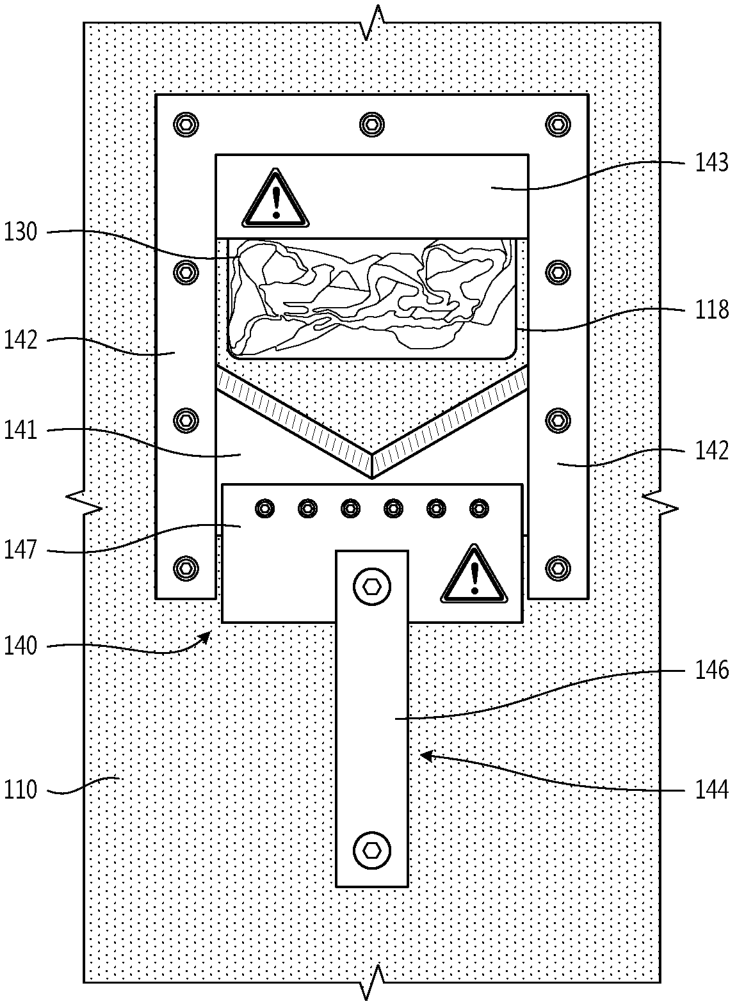
FIG. 2 depicts an embodiment of a cutting system capable of either partially or fully cutting converted sheet material, in accordance with the embodiments described herein.

Depicted in FIG. 2 is an embodiment of a cutting system 140 in the conversion machine 110 that is capable of either partially or fully cutting converted sheet material. The cutting system 140 includes a cutter 141. In the depicted embodiment, the cutter 141 is a blade. In particular, the blade of the cutter 141 in the depicted embodiment is a V-shaped blade. In the depicted embodiment, the cutting system 140 also includes a guide 142 configured to guide the cutter 141. In particular, the depicted embodiment of the guide 142 includes two vertical guides, each of which engages a side of the cutter 141 so that the cutter 141 can move vertically as it is guided by the guide 142. The depicted embodiment of the cutting system 140 also includes a cutter receptacle 143 into which the blade of the cutter 141 can be inserted. The cutter 141, the guide 142, and the cutter receptacle 143 are positioned such that, as the blade of the cutter 141 enters the cutter receptacle 143, the blade of the cutter 141 cuts the fill material 130 that extends through the outlet 118. In some embodiments, the cutter receptacle 143 is a slot into which the cutter 141 enters. In other embodiments, the cutter receptacle 143 is another cutting surface (e.g., a blade) which works in tandem with the cutter 141 to cut the fill material 130.

The cutting system 140 further includes a mover 144 configured to move the cutter 141. In the depicted embodiment, the mover 144 includes a first linkage 145 (not visible in FIG. 2, but visible in FIGS. 3 and 6) and a second linkage 146. The first linkage 145 is rotatably coupled to the conversion machine 110. The second linkage 146 is rotatably coupled to the first linkage at one end and rotatably coupled to a bracket 147 at the other end. The bracket 147 is fixed with respect to the cutter 141 such that movement of the first linkage 145 causes corresponding movement of the second linkage 146, which causes corresponding movement of the bracket 147 and the cutter 141. In the depicted embodiment, rotational movement of the first linkage 145 is transmitted through the second linkage 146 to cause a linear movement of the bracket 147 and cutter 141. The cutting system 140 further includes a motor (not visible) configured to rotate the first linkage 145 in a controlled manner. For example, the motor can be a stepper motor and at least one of a rotational speed, a torque, a degree of rotation, a start position, or a stop position of the stepper motor can be controlled such that the rotational movement of the first linkage 145 is controlled.

Figure 6:
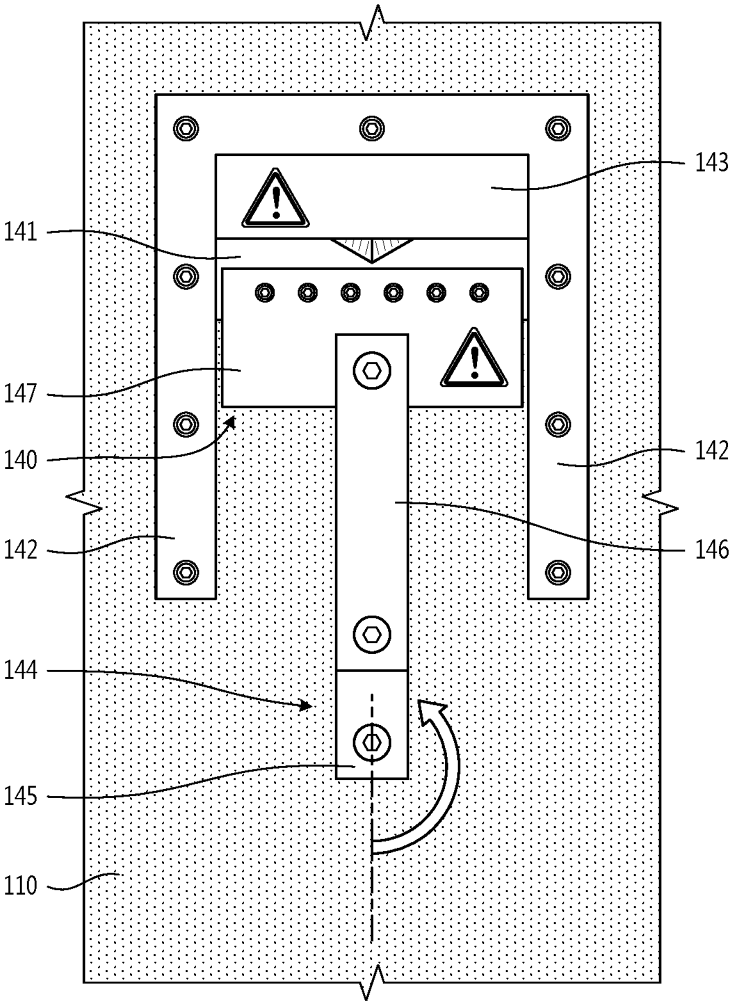
FIG. 6 depicts an embodiment of the cutting system shown in FIG. 2 as it fully cuts converted sheet material, in accordance with the embodiments described herein.

The cutting system 140 is capable of either partially or fully cutting the fill material 130. In the depicted embodiment, the cutting system 140 either partially or fully cuts the fill material 130 depending on the extent to which the cutter 141 is moved vertically by the mover 144. Examples of partially and fully cutting the fill material 130 by the cutting system 140 are shown in FIGS. 3 and 6, respectively, and discussed in more detail below.

Figure 3:
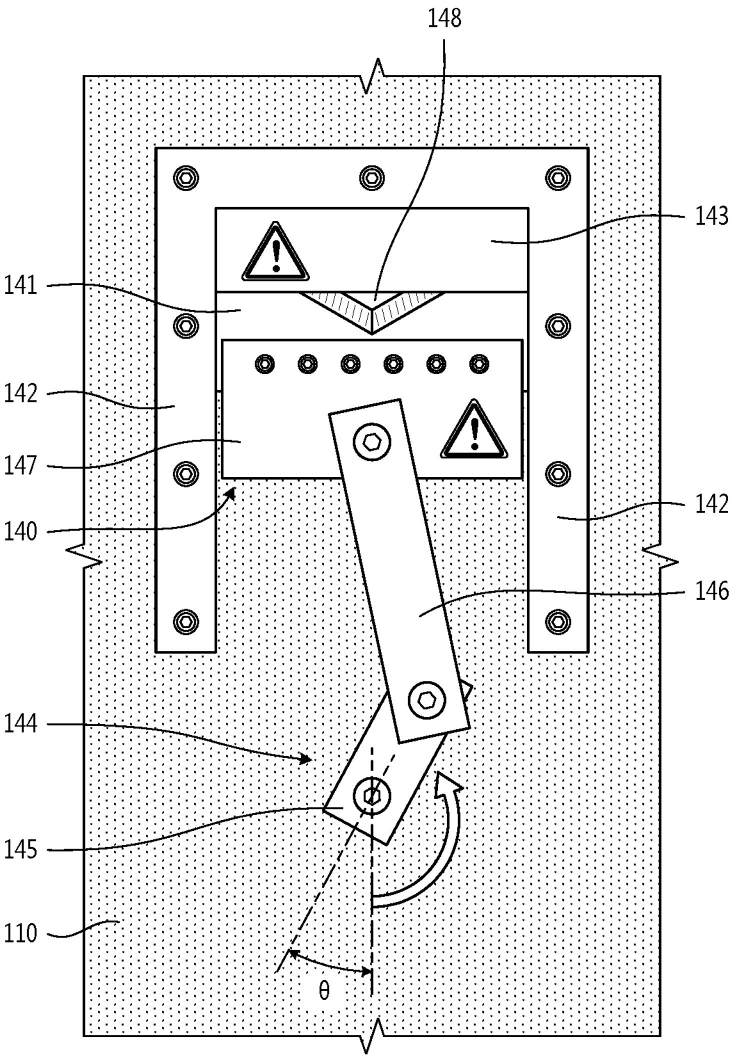
FIG. 3 depicts an embodiment of the cutting system shown in FIG. 2 as it partially cuts converted sheet material, in accordance with the embodiments described herein.

FIG. 3 depicts an embodiment of the cutting system 140 partially cutting converted fill material 130. In the depicted embodiment, the first linkage 145 has been rotated by the motor in a counterclockwise direction. The rotation of the first linkage 145 has caused the second linkage 146 to extend and push the bracket 147 and cutter 141 vertically upward. The first link 145 has been rotated so that the cutting system does not completely cut the fill material 130. In the particular example shown in FIG. 3, the first linkage 145 has not been fully rotated to a vertical position, but has been stopped short of vertical by an angle $\theta$. That position of the first linkage 145 causes the second linkage 146, the bracket 147, and cutter 141 to move vertically upward such that a gap 148 remains between a portion of the cutter 141 and the cutter receptacle 143. In the depicted embodiment, the gap 148 is formed by a portion of the cutter 141 that includes a corner of the V-shaped blade. The movement of the cutter 141 to the position shown in FIG. 3 causes the fill material 130 to be cut by the portions of the cutter 141 that moves into the cutter receptacle 143 and leaves portions of the fill material 130 in the gap 148 to remain uncut. In some embodiments, the movement of the first linkage 145 is stopped so that the width of gap 148 is a percentage of the width of the cutter 141 that is less than or equal to any one of 10%, 9%, 8%, 7%, 6%, 5%, 4%, 3%, 2%, or 1%.

Figure 4:
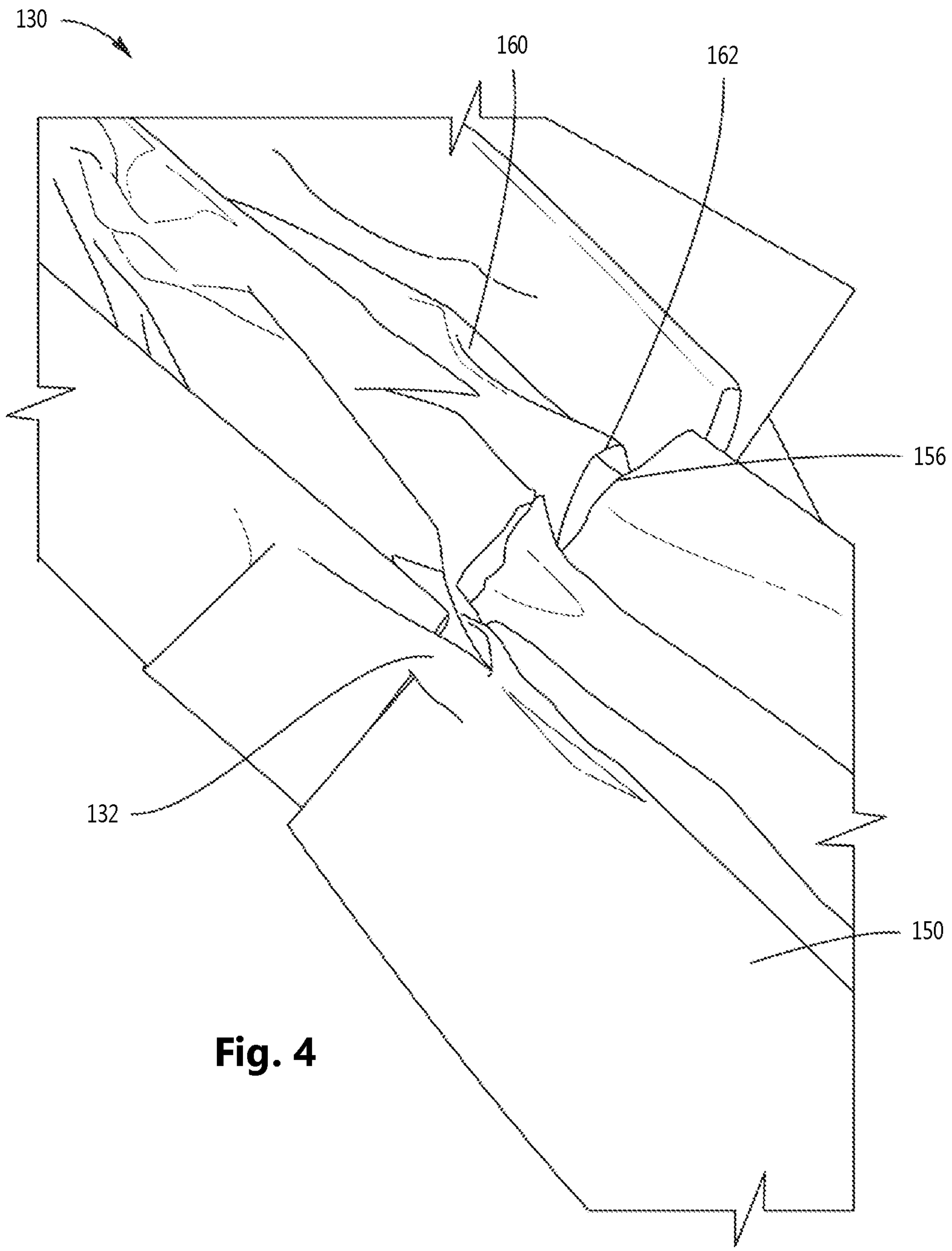
FIG. 4 depicts an embodiment of two pieces of partially cut fill material before the two pieces of partially cut fill material have been separated, in accordance with the embodiments described herein.

Depicted in FIG. 4 is an embodiment of two pieces 150 and 160 of the fill material 130 after the partial cut is made in the fill material 130 by cutting system 140 and before the two pieces 150 and 160 of cut fill material 130 have been separated from each other. As can be seen in FIG. 4, the cutter 141 of the cutting system 140 cut through multiple folded or crumpled plies of the fill material 130 to form a trailing end 156 in the piece 150 of the fill material 130 and a leading end 162 in the piece 160 of the fill material 130. The leading and trailing ends 156 and 162 were formed by the portions of the cutter 141 that were outside of the gap 148. The gap 148 between the cutter 141 and the cutter receptacle 143 left a number of uncut portions 132 (though only one is visible in FIG. 4) across the cut trailing end 156 and leading end 162 of the two pieces 150 and 160 of the fill material 130. With the uncut portions 132 of the fill material 130 in place, the two pieces 150 and 160 of the fill material 130 remain connected to each other. This keeps the piece 150 connected to the piece 160 until the piece 150 is pulled from the piece 160. Thus, when the piece 160 is part of the fill material 130 inside the conversion machine 110, the conversion machine continues to hold the piece 150 on the end of the piece 160 until the piece 150 is pulled away from the piece 160.

Figure 5:
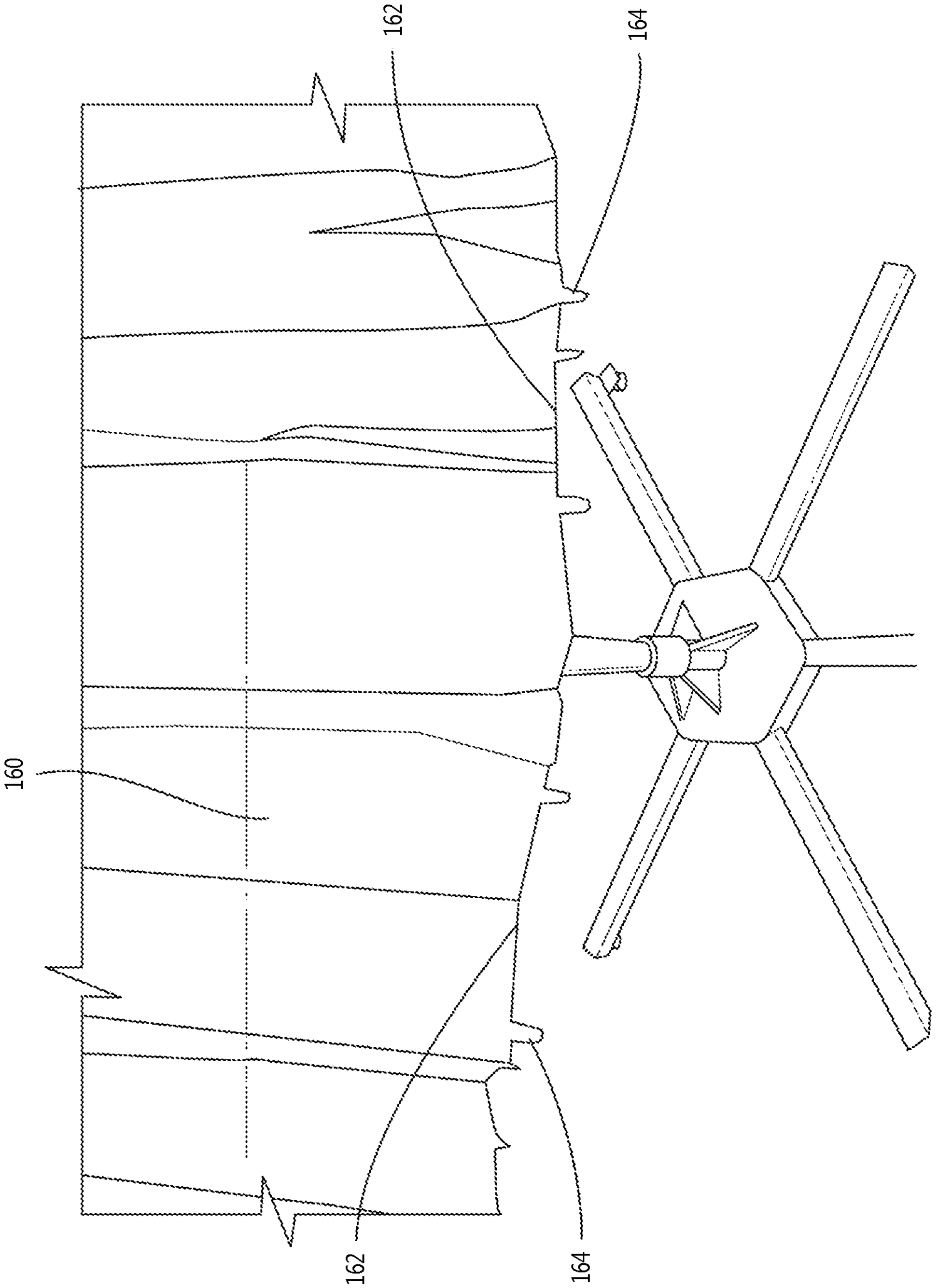
FIG. 5 depicts an embodiment of one of the two pieces of partially cut fill material shown in FIG. 4 after the two pieces of partially cut fill material have been separated, in accordance with the embodiments described herein.

Depicted in FIG. 5 is an example of the piece 160 of the fill material 130 after the two pieces 150 and 160 of the fill material 130 have been separated from each other. In some embodiments, the piece 150 was separated from the piece 160 by a person (e.g., a packer) pulling the piece 150, which caused the uncut portions 132 between the two pieces 150 and 160 to tear. In the depicted embodiment, most of the uncut portions 132 tore on the side of the uncut portions 132 closer to the piece 150 such that the uncut portions 132 became tabs 164 on the leading end 162 of the piece 160 when the piece 150 was pulled away from the piece 160.

As described above, a piece of fill material can be created by a process that includes advancing the fill material 130 by the conversion machine 110, partially cutting the fill material 130 by a cutting system 140 that leaves uncut portions between two pieces, and pulling the piece away from the fill material 130 by a person to tear the uncut portions. The piece of the fill material 130 is then separated and can be used as fill. In some embodiments, the conversion machine 110 can detect that the piece has been torn away and then automatically advance the fill material 130 and cut the material 130 so that uncut portions remain. This process can be repeated as many times as the person continues to pull pieces away from the fill material 130.

Some of the benefits of the embodiments described herein over existing conversion machines include reduced complexity, lower cost, and greater reliability. With cut-and-hold systems, not only do those systems have a severing mechanism but also a tension holding mechanism. In contrast, the embodiments disclosed herein include a cutting system that leaves uncut portions of the fill material after a cut instead of having both a severing mechanism and a tension holding mechanism. This not only reduces cost because of the reduced number of parts, but also reduces the complexity of the conversion machine because the fill material holds the cut piece instead of a tension mechanism in the conversion machine holding the cut piece. In addition, the issue of inadvertent falling of fill pieces in existing system is addressed by the embodiments described herein because the uncut portions prevent a cut piece of fill from falling from the force of gravity alone. This increases the reliability of the embodiments disclosed herein over existing conversion machines.

While there may be settings or situations where partially cutting the fill material 130 (e.g., as shown in FIGS. 3-5) may be advantageous, there may be other situations where completely cutting the fill material 130 may be advantageous. One of the advantages of the cutting system 140 is that, in addition to performing partial cuts of the fill material 130, the cutting system 140 can also perform complete cuts of the fill material 130.

FIG. 6 depicts an embodiment of the cutting system 140 fully cutting converted fill material 130. In the depicted embodiment, the first linkage 145 has been rotated by the motor in a counterclockwise direction. The rotation of the first linkage 145 has caused the second linkage 146 to extend and push the bracket 147 and cutter 141 vertically upward. The first link 145 has been rotated so that the cutting system completely cuts the fill material 130. In the particular example shown in FIG. 6, the first linkage 145 has been fully rotated to a vertical position. That position of the first linkage 145 causes the second linkage 146, the bracket 147, and cutter 141 to move vertically upward such that the cutting surface of the cutter 141 completely enters the cutter receptacle 143 and there is no gap between the cutting surface of the cutter 141 and the cutter receptacle 143. The movement of the cutter 141 to the position shown in FIG. 6 causes the fill material 130 to be completely cut by the cutter 141.

Figure 7:
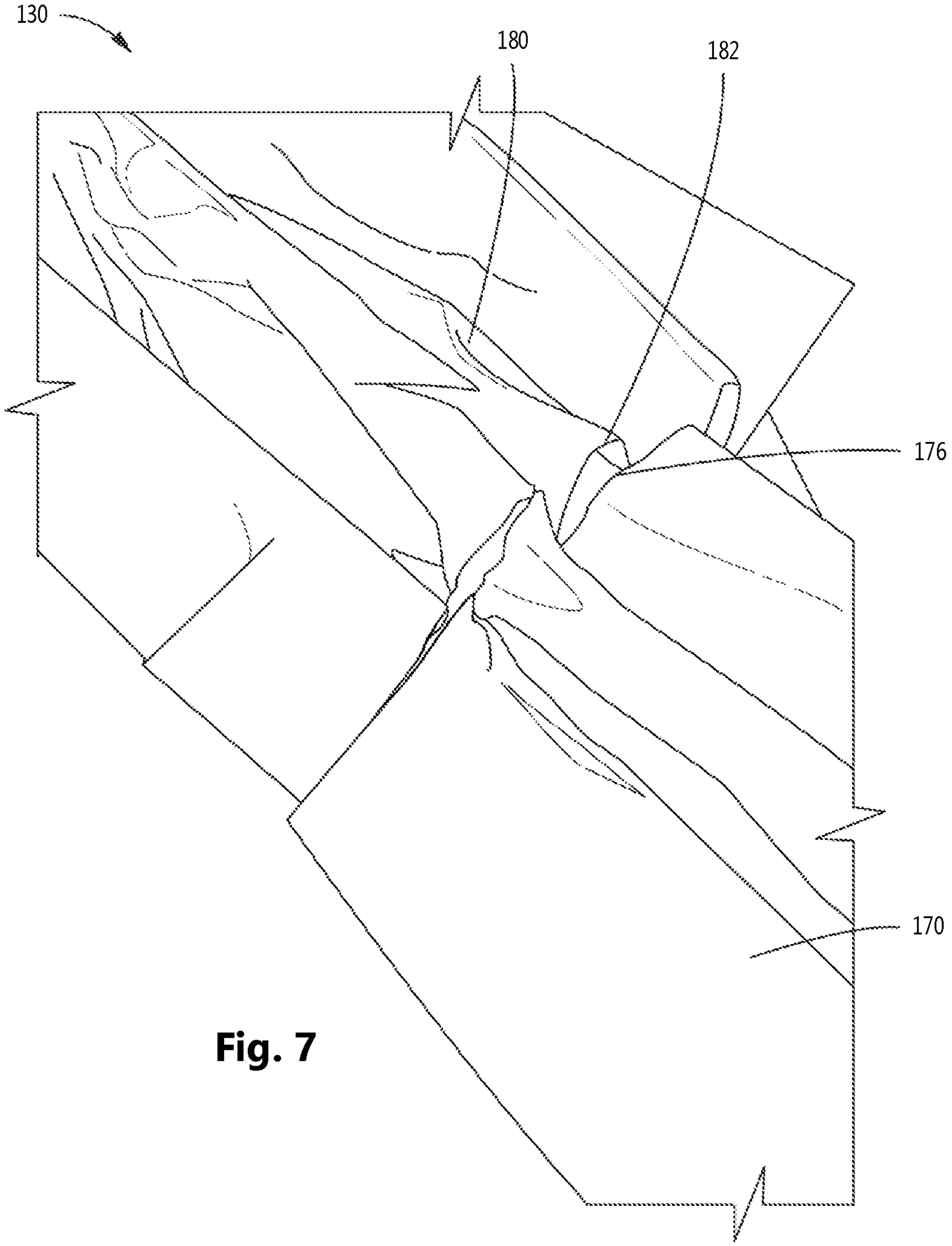
FIG. 7 depicts an embodiment of two pieces of fully cut fill material before the two pieces of fully cut fill material have been moved away from each other, in accordance with the embodiments described herein.

Depicted in FIG. 7 is an embodiment of two pieces 170 and 180 of the fill material 130 after the complete cut is made in the fill material 130 by the cutting system 140. As can be seen in FIG. 4, the cutter 141 of the cutting system 140 cut through multiple folded or crumpled plies of the fill material 130 to form a trailing end 176 in the piece 170 of the fill material 130 and a leading end 182 in the piece 180 of the fill material 130. The leading and trailing ends 176 and 182 were formed by the cutter 141 as it passed into the cutter receptacle 143. Because there was no gap left between the cutter 141 and the cutter receptacle 143, there are no uncut portions between the cut trailing end 176 and leading end 182 of the two pieces 170 and 180 of the fill material 130. Thus, the two pieces 170 and 180 of the fill material 130 are not connected to each other. Thus, when the piece 180 is part of the fill material 130 inside the conversion machine 110, the piece 170 can fall, be removed manually, or otherwise distanced from the piece 180 inside of the conversion machine 110.

Figure 8:
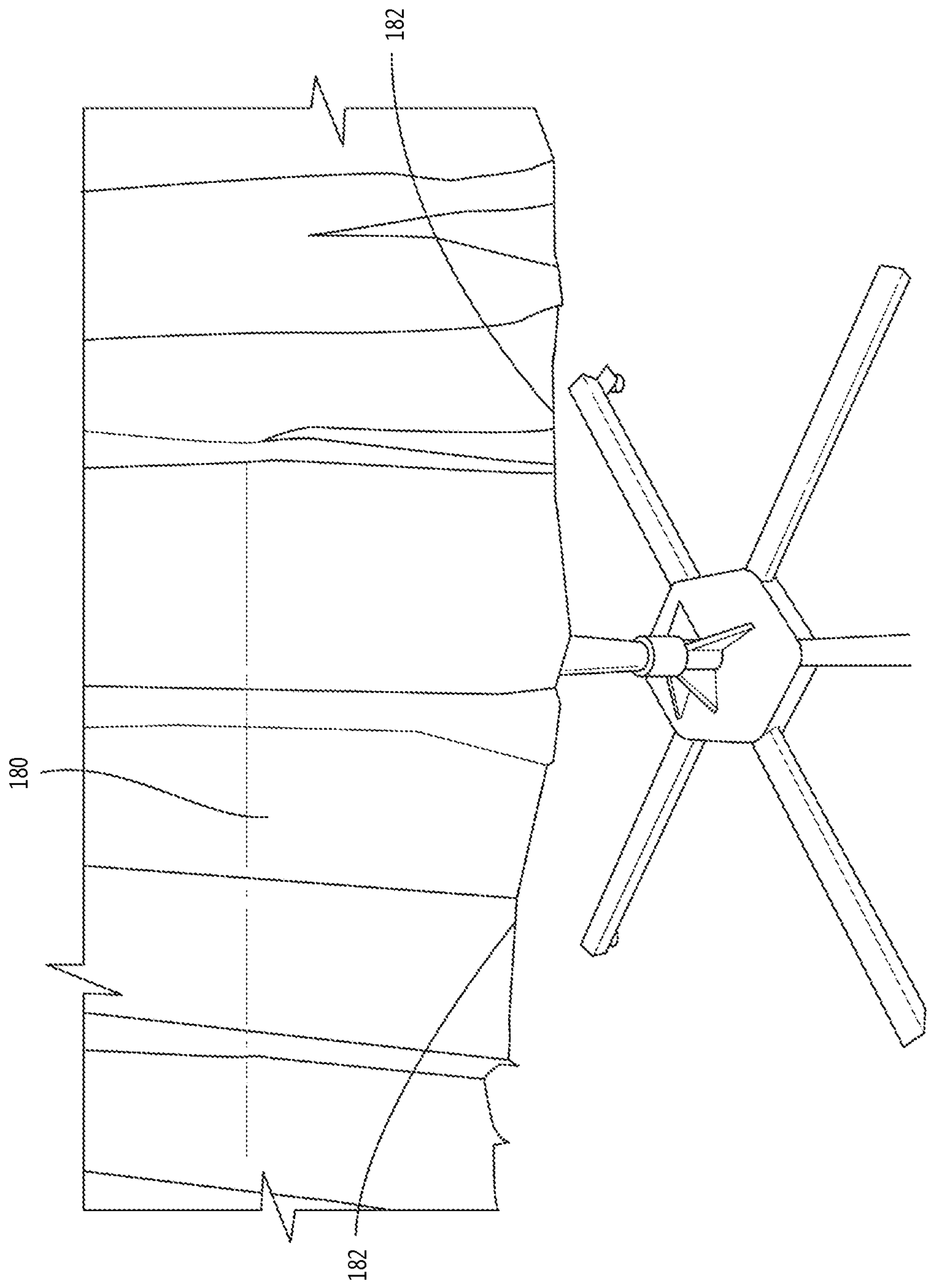
FIG. 8 depicts an embodiment of one of the two pieces of fully cut fill material shown in FIG. 7 after the two pieces of fully cut fill material have been separated, in accordance with the embodiments described herein.

Depicted in FIG. 8 is an example of the piece 180 of the fill material 130 after the piece 170 has been moved away from the piece 180. In some embodiments, the piece 170 can simply fall away from the piece 180. In other embodiments, the piece 170 can be manually separated from the piece 180 by a person (e.g., a packer) holding the piece 180 while the cutting system 140 makes the complete cut and then pulling the piece 170 away from the piece 180.

As described above, a piece of fill material can be created by a process that includes advancing the fill material 130 by the conversion machine 110, completely cutting the fill material 130 by a cutting system 140, and then using the completely-cut piece as fill. This process can be repeated as many times as desired to form completely-cut pieces of the fill material 130.

In some embodiments, the conversion machine 110 includes a computing device (e.g., a controller) configured to control the motor of the cutting system 140 to control whether the cutting system 140 makes a partial cut or a complete cut of the fill material 130. The computing device can control the cutting system based on a user input (e.g., a user selection of partial or full cut), a signal from a sensor (e.g., a sensor that detects an item to be packaged where the computing devices determines a number of connected pieces of fill material to cut for that item), a control signal from another computing device (e.g., a computing device that coordinates packaging at multiple stations within a packaging facility), any other factor, or any other combination thereof. In some embodiments, the computing device that controls the cutting system 140 can be fully integrated with the conversion machine 110 or can be a computing device external to and in communication with the conversion machine 110.

For purposes of this disclosure, terminology such as "upper," "lower," "vertical," "horizontal," "inwardly," "outwardly," "inner," "outer," "front," "rear," and the like, should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Unless stated otherwise, the terms "substantially," "approximately," and the like are used to mean within 5% of a target value.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

What is claimed is:

1. A system comprising:
- a source of sheet material; and
- a conversion machine configured to receive the sheet material and to form the sheet material into a fill material;
- a cutting system configured to selectively cut the fill material either partially or completely to form two pieces of the fill material, wherein:
  - when the cutting system partially cuts the fill material, a plurality of uncut portions of the fill material remain between the two pieces of the fill material; and
  - when the cutting system completely cuts the fill material, no uncut portions remain between the two pieces of the fill material;
- wherein the cutting system includes a cutter in the form of a V-shaped blade; and
- wherein, when the cutting system partially cuts the fill material, the V-shaped blade leaves the plurality of uncut portions of the fill material between the two pieces of the fill material.

2. The system of claim 1, wherein, when the cutting system partially cuts the fill material, the uncut portions are arranged such that, when one of the two pieces of the fill material is pulled away from each other, the uncut portions tear, resulting in the two pieces of the fill material being separated from each other.

3. The system of claim 1, wherein:
- the cutting system includes a cutter receptacle; and
- when the cutting system partially cuts the fill material, the cutter is moved to a point where a gap remains between a portion of the cutter and a portion of the cutter receptacle.

4. The system of claim 3, wherein a width of the gap is a percentage of the width of the cutter that is less than or equal to 10%.

5. The system of claim 3, wherein the portion of the cutter that forms the gap includes an angle of the V-shaped blade.

6. The system of claim 3, wherein the cutting system further includes a motor configured to move the cutter with respect to the cutter receptacle.

7. The system of claim 6, wherein the motor is coupled to a first linkage and configured to rotate the first linkage.

8. The system of claim 7, wherein the first linkage is rotatably coupled to a second linkage and wherein the second linkage is rotatably coupled to the cutter.

9. The system of claim 8, wherein the motor is configured to move the cutter by rotating the first linkage.

10. The system of claim 9, wherein the motor is configured to cause the cutting system to make a complete cut by rotating the first linkage to a first rotational position, and wherein the motor is configured to cause the cutting system to make a partial cut by rotating the first linkage to a second rotational position that is different from the first rotational position.

11. The system of claim 1, wherein, when the cutting system partially cuts the fill material, a percentage of a width of the fill material that remains connected by the uncut portions is in a range between about 1% and about 10%.

12. The system of claim 1, wherein, when the cutting system partially cuts the fill material, a percentage of a width of the fill material that remains connected by each of the uncut portions is less than or equal to any one of 1%, 0.8%, 0.6%, 0.4%, or 0.2%.

13. A method comprising:

converting, by a fill conversion machine, a sheet material into a fill material;

cutting, by a cutting system of the fill conversion machine, the fill material to form two pieces of fill material, wherein the two pieces of fill material include a first piece and a second piece, wherein the fill conversion machine is capable of both:

making a partial cut of the fill material, wherein the partial cut leaves uncut portions of the fill material between the first and second pieces of the fill material, and making a complete cut of the fill material, wherein the complete cut leaves no uncut portions remaining between the first and second pieces of the fill material;

wherein the cutting system includes a cutter in the form of a V-shaped blade; and wherein, when making a partial cuts of the fill material, the V-shaped blade leaves the plurality of uncut portions of the fill material between the two pieces of the fill material.

14. The method of claim 13, wherein cutting the fill material comprises making the partial cut, and wherein the method further comprises:

holding, by the conversion machine, a second piece of the two pieces of fill material;

wherein the first piece is separable from the second piece during the holding by pulling the first piece from the second piece to cause the uncut portions of the fill material to tear.

15. The method of claim 14, further comprising:

detecting, by the conversion machine, that the first piece has been pulled away from the second piece.

16. The method of claim 15, further comprising:

in response to the detecting, automatically advancing, by the conversion machine, the fill material out of the fill conversion machine;

in response to the detecting, automatically cutting, by the cutting system of the conversion machine, the fill material to form a cut between the second piece and a third piece of the fill material such that uncut portions of the fill material remain between the second and third pieces of fill material.

17. The method of claim 16, further comprising:

holding, by the conversion machine, the third piece of fill material;

wherein the second piece is separable from the third piece during the holding of the third piece by pulling the second piece from the third piece to cause the uncut portions of the fill material between the second and third pieces to tear.

18. The method of claim 13, further comprising:

receiving, by a computing device of the fill conversion machine, a user input indicating a type of cut to be made; and controlling, by the computing device, the cutting system to make either the partial cut or the complete cut based at least in part on the user input.

19. The method of claim 13, further comprising:

receiving, by a computing device of the fill conversion machine, a signal from a sensor; and controlling, by the computing device, the cutting system to make either the partial cut or the complete cut based at least in part on the signal from the sensor.

* * * * *